Sept. 22, 1964   C. M. BURGESS   3,149,747
SNAP-ON CONNECTED PLATE STRUCTURE
Filed Dec. 28, 1961
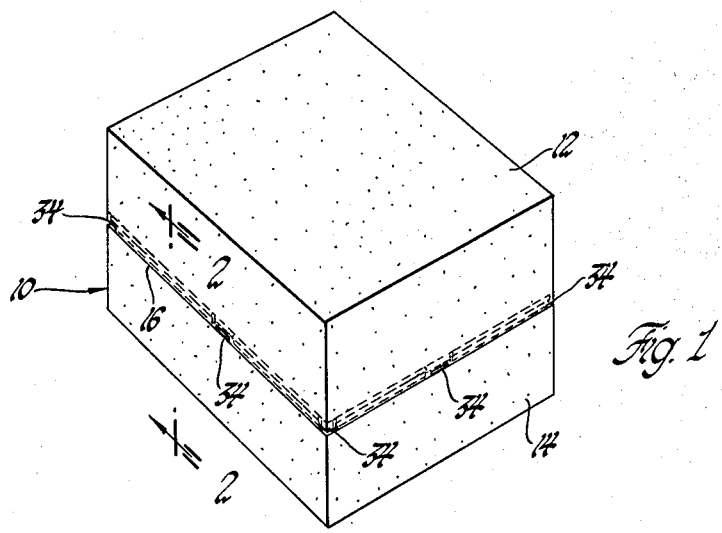
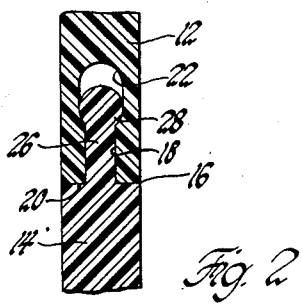
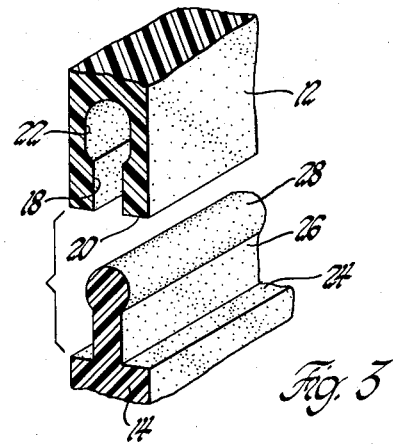
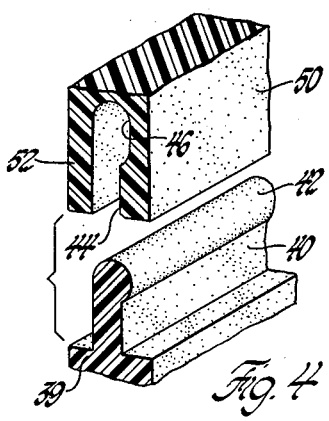
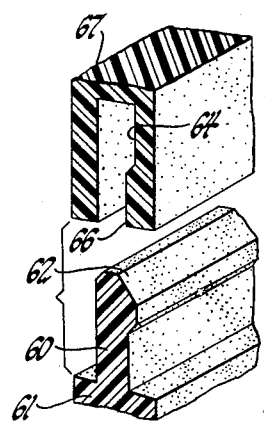
INVENTOR.
Carlton M. Burgess
BY George E. Johnson
ATTORNEY

United States Patent Office 3,149,747
Patented Sept. 22, 1964

3,149,747
SNAP-ON CONNECTED PLATE STRUCTURE
Carlton M. Burgess, Burt, N.Y., assignor to General Motors Corporation, Detroit, Mich., a corporation of Delaware
Filed Dec. 28, 1961, Ser. No. 162,766
1 Claim. (Cl. 220—60)

This invention relates to plate structures and more particularly to structures comprising casings and walls employing plastic material in the form of at least one sheet having its edge detachably or permanently joined to another element which may or may not be in the form of a sheet.

In joining plastic sheets or casing portions in the forming of enclosures for components of heating or air conditioning systems in automobiles, for example, it has heretofore been the practice to thicken sheet material employed along edges of the latter to accommodate fastenings such as clamps, bolts or screws. Thickening the plastic material to make edge bosses or flanges adds to the manufacturing cost and reduces the esthetic value of the product. It also adds objectional bulk which serves no purpose other than making conventional fastenings usable.

An object of the present invention is to provide improved plate structures such as walls or casings each having at least one plastic wall and the elements of which are joined into units by snap or sliding action. Another object is to provide a plate structure in which a plastic sheet is joined and retained in edge relationship with a second element by snap or sliding action with or without the use of an adhesive.

A feature of the present invention is a structure in which a grooved plastic sheet is joined and retained in edge relationship with another element by a tongue integral with the latter and in which separation of the elements is resisted by resilience of the plastic sheet material in retaining the tongue. Another feature is a wall or casing structure including a plastic sheet grooved along one edge resiliently to clamp or retain an enlarged portion of a tongue formed on another element of the structure.

These and other important features of the invention will now be described in detail in the specification and then pointed out more particularly in the appended claims.

In the drawings:

FIGURE 1 is a perspective view of a casing or box with two halves or portions representing elements joined to form a unitary structure in accordance with the present invention;

FIGURE 2 is an enlarged sectional view looking in the direction of the arrows 2—2 in FIGURE 1;

FIGURE 3 is an exploded view of elements in section and as shown in FIGURE 2;

FIGURE 4 is a view similar to that of FIGURE 3 but illustrating a modified arrangement; and FIGURE 5 presents an exploded view similar to that of FIGURE 4 but illustrates another modification.

In FIGURE 1, an enclosure in the form of a box or casing is generally indicated at 10 as comprising a top element 12 and a bottom element 14. These elements are made from a resilient plastic material and experience has shown that such a box made with walls of sheet material approximately 3/32 of an inch in thickness can be very solidly joined together by practicing the present invention. The two elements 12 and 14 have their edge surfaces abutting at the interface 16. A continuous groove 18 is formed extending along the bottom edge surface 20 of the element 12 and this groove is enlarged at its base as at 22. Extending from the edge surface 24 of the element 14 is a number of tongues 26. Each tongue bears a beading as at 28.

In the particular embodiment of FIGURE 1, the tongues 26 are in series extending around the entire box 10 but slots 34 are formed at the corners and in the middle of each side of the box. One or more slots 34 are provided preferably in the areas between the tongues 26. In the embodiment shown the slots 34 are formed in the top element 12 but the slot may also be formed in the bottom element as will be obvious as the description proceeds.

The tongue and groove arrangement supplied by means of each tongue 26 and the corresponding portion of the groove 18 is so proportioned that when a corner of the box is to be joined a slight pressure will cause the one end of the beading 28 on one tongue to mate with the groove and by applying the pressure progressively around the periphery of the box the attachment of the two elements may be completed. The plastic material of the top element 12 has sufficient resilience to give a snap action after yielding to receive the beading 28 and firmly grasping the tongue 26 and holding the two elements 12 and 14 together. In the event that the two elements are to be separated the insertion of a screwdriver or knife blade into one or more of the slots 34 permits a wedge action and progressive disconnecting of the joint is easily performed. The holding power of the joint may be surprisingly great and opening of the joint without the twisting action of a tool between the elements would be difficult. If desired, a slot may be provided through only one side of one of the joined pieces—stopping short of the tongue but adequate to receive a prying tool.

If desired, the tongues could be integral with alternating elements along the box periphery and the grooves 18 could be made accordingly—i.e.—the tongues and grooves could alternate along the attachment edge of each element 12 and 14 in FIGURE 1.

In FIGURE 4, a different form of tongue is shown at 40 on an element 39. This tongue is so made as to have a beading 42 extending along one side only of the tongue. In view of the shape of the tongue the groove 44 in an engaging element 50 is enlarged only at one side as at 46. In this form of construction any outward bending of the plastic material in the element 50 would be on only one side of the latter and the other side 52 would escape any appearance of deformation. A slight deformation of the plastic material on at least one side of a groove is preferred in order that the corresponding beading be resiliently retained. In some instances, however, the beading and/or tongue may be made to fit snugly and without any plastic deformation after assembly.

FIGURE 5 depicts another modification wherein no curved surfaces are utilized in the tongue and groove arrangement. The tongue 60 on an element 61 bears flat surfaces 62 forming a bead which fits within the enlarged portion 64 of a groove 66 cut in an element 67. Small spaces will be left in the groove for the reception and retention of an adhesive if such adhesive is desirable in a particular use not only to make the joint stronger but also to discourage tampering.

Casings with walls joined as taught herein are attractive in appearance and particularly adaptable for use in enclosing evaporator cores, heater cores and other devices commonly utilized in automobile heating and air conditioning systems. A given casing may be made in two or more parts or elements and these parts may be quickly joined and very readily separated to permit repair or replacement of the enclosed devices. It is obvious that the plastic material should be sufficiently resilient to withstand stresses of applying each tongue to the grooved sheet with a snap action but it is also important that the grooved material retain its resiliency and therefore its holding power for such a length of time as is desirable.

Plastics are now available which withstand aging and at the same time retain their resiliency. It is surprising that thin sheets in the neighborhood of 3/32 of an inch in thickness may be effectively joined in the manner indicated and it should be appreciated that each joint may be made in some instances by a sliding action of a given tongue with relation to its receiving groove. Also, the tongued elements 14, 39, and 61 shown in the drawings could be made of metal, glass, ceramics or wood and need not be of sheet material insofar as practicing the broad scope of the present invention with the use of one sheet of plastic material is concerned. The application of the present inventive concept to the joinder of multiple plastic sheets is, however, most surprising in its effectiveness.

Among the materials which have been found suitable for the plastic sheet or grooved material are various acrylonitrile - butadiene - styrene polymers. Other polymeric materials such as polyethylene, polyamide, polystyrene and polypropylene may be used satisfactorily if so compounded and prepared as to provide the mechanical strength and resistance to aging, temperature changes, or other chemical action requisite for the particular use under consideration.

I claim:

A casing having a plate structure comprising two wall elements, said elements being in plastic sheet form of a single and uniform thickness with one edge surface of one element abutting the edge surface of the other element, one of said edge surfaces being provided with a groove having an opening extending along the length of said one edge surface, said groove being enlarged to form an elongated recess within said sheet form, a beaded tongue integral with the edge surface of said other element and snugly retained by the sides of said groove and elongated recess to form a snap-on joint of said single thickness, a slot located at the interface of said two elements and extending into said structure and adjacent to said tongue, said slot being adapted to receive a prying instrument for separating said elements, and the plastic material of said casing defining the groove resiliently holding the two wall elements together.

References Cited in the file of this patent
UNITED STATES PATENTS

| | | |
|---|---|---|
| 2,701,229 | Scherr | Feb. 1, 1955 |
| 2,720,332 | Holt | Oct. 11, 1955 |
| 2,764,308 | Hoch | Sept. 25, 1956 |
| 2,780,385 | Tupper | Feb. 5, 1957 |
| 2,823,249 | Curtiss | Feb. 11, 1958 |
| 2,828,789 | Groendyk et al. | Apr. 1, 1958 |
| 2,837,236 | Betner | June 3, 1958 |
| 2,869,207 | Berstein | Jan. 20, 1959 |
| 2,989,205 | Yaws | June 20, 1961 |
| 2,990,082 | Boysen | June 27, 1961 |